United States Patent
Philpott et al.

(10) Patent No.: US 9,454,648 B1
(45) Date of Patent: Sep. 27, 2016

(54) DISTRIBUTING TOKEN RECORDS IN A MARKET ENVIRONMENT

(75) Inventors: Robert S Philpott, Andover, MA (US);
William Duane, Westford, MA (US);
Christopher Duane, Groton, MA (US);
Gareth Richards, Woodstock (GB)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 13/336,043

(22) Filed: Dec. 23, 2011

(51) Int. Cl.
G06F 11/30 (2006.01)
G06F 21/00 (2013.01)
G06F 21/10 (2013.01)
H04L 9/08 (2006.01)

(52) U.S. Cl.
CPC ............ *G06F 21/10* (2013.01); *H04L 9/0866* (2013.01)

(58) Field of Classification Search
CPC .......................... H04L 9/0869; H04W 12/00
USPC ............... 713/194, 159, 172, 182; 705/56; 405/56; 380/44, 262; 726/6, 7, 9, 20
See application file for complete search history.

(56) References Cited

U.S. PATENT DOCUMENTS

| | | | | |
|---|---|---|---|---|
| 6,205,549 B1* | 3/2001 | Pravetz | ........................ | 713/182 |
| 6,226,618 B1* | 5/2001 | Downs et al. | .................. | 705/51 |
| 7,111,172 B1* | 9/2006 | Duane et al. | .................. | 713/182 |
| 7,124,443 B2* | 10/2006 | Ishibashi | ............... | G06Q 20/00 705/51 |
| 7,333,616 B1* | 2/2008 | Brettle et al. | ................. | 380/277 |
| 7,461,405 B2* | 12/2008 | Boudreault | .......... | H04N 7/1675 348/E7.056 |
| 7,599,495 B2* | 10/2009 | Kurihara et al. | ............. | 380/201 |
| 7,702,107 B1* | 4/2010 | Messing | ....................... | 380/259 |
| 8,640,945 B1* | 2/2014 | McCormick | .................. | 235/379 |
| 2002/0029195 A1* | 3/2002 | Russell et al. | ..................... | 705/40 |
| 2002/0091649 A1* | 7/2002 | Anvekar | ............ | G06Q 20/4012 705/72 |
| 2003/0023862 A1* | 1/2003 | Yamasaki et al. | ............ | 713/194 |
| 2003/0204443 A1* | 10/2003 | Knox | ............................... | 705/14 |
| 2004/0098348 A1* | 5/2004 | Kawasaki et al. | ............... | 705/59 |
| 2004/0190868 A1* | 9/2004 | Nakano et al. | .................. | 386/94 |
| 2004/0255134 A1* | 12/2004 | Miyamoto | .................... | 713/193 |
| 2005/0015588 A1* | 1/2005 | Lin et al. | ....................... | 713/159 |
| 2005/0108175 A1* | 5/2005 | Clark | ............................... | 705/59 |
| 2005/0154890 A1* | 7/2005 | Vembu | .......................... | 713/171 |
| 2006/0126846 A1* | 6/2006 | Araki et al. | .................. | 380/277 |
| 2006/0174104 A1* | 8/2006 | Crichton et al. | .............. | 713/155 |
| 2007/0033642 A1* | 2/2007 | Ganesan et al. | ................. | 726/10 |
| 2007/0155306 A1* | 7/2007 | Koli et al. | .................... | 455/3.01 |
| 2007/0174614 A1* | 7/2007 | Duane et al. | ................. | 713/168 |
| 2008/0133408 A1* | 6/2008 | Nakfoor | ............... | G06Q 20/102 705/40 |

(Continued)

*Primary Examiner* — Dede Zecher
*Assistant Examiner* — Abdullah Almamun
(74) *Attorney, Agent, or Firm* — Krishnendu Gupta; Jason A. Reyes

(57) ABSTRACT

Method and system for distributing token records in market environment is disclosed. At least one token record comprising a unique seed associated with a OTP token. Encryption key and decryption key are generated for assisting selective encryption and decryption of token record associated with OTP token. The token record is encrypted with the assistance of encryption key. One of encrypted token record and decryption key is provided into market environment. A device comprising an identifier for facilitating identification of token record associated with OTP token is provided into market environment together with the one of encrypted token record and decryption key. The identifier concealed by tamper-evident removable material such that any effort to reveal identifier will be readily apparent. The other of the encrypted token record and decryption key is provided to an entity in response to entity providing identifier.

20 Claims, 4 Drawing Sheets

(56) References Cited

U.S. PATENT DOCUMENTS

| | | | |
|---|---|---|---|
| 2008/0168543 A1* | 7/2008 | von Krogh | 726/6 |
| 2008/0168544 A1* | 7/2008 | von Krogh | 726/6 |
| 2008/0287176 A1* | 11/2008 | Bennett, III | 463/17 |
| 2009/0006219 A1* | 1/2009 | Blake | G06Q 20/105 |
| | | | 705/65 |
| 2009/0006858 A1* | 1/2009 | Duane et al. | 713/185 |
| 2009/0083372 A1* | 3/2009 | Teppler | 709/203 |
| 2010/0162377 A1* | 6/2010 | Gonzalez et al. | 726/9 |
| 2010/0205448 A1* | 8/2010 | Tarhan et al. | 713/185 |
| 2011/0082799 A1* | 4/2011 | Parduhn et al. | 705/75 |
| 2011/0213969 A1* | 9/2011 | Nakhjiri et al. | 713/158 |
| 2011/0281630 A1* | 11/2011 | Omar | G06F 21/33 |
| | | | 463/17 |
| 2012/0246461 A1* | 9/2012 | Buckley et al. | 713/150 |
| 2012/0278189 A1* | 11/2012 | Goldberg | G06Q 20/06 |
| | | | 705/17 |
| 2013/0126599 A1* | 5/2013 | Soske | G06F 17/30002 |
| | | | 235/375 |
| 2016/0012256 A1* | 1/2016 | Topham | G06F 21/73 |
| | | | 713/193 |

* cited by examiner

DISTRIBUTING TOKEN RECORDS IN A MARKET ENVIRONMENT

TECHNICAL FIELD

The invention relates to distributing token records in a market environment.

BACKGROUND OF THE INVENTION

Computer networks, and in particular Wide Area Networks (WANs) such as the internet, provide opportunities for the misuse and abuse of communications. For example, two users (e.g., a human user and an enterprise server) communicating via the WAN may have their communications intercepted and/or altered. Also, it is possible for one user to misrepresent his, her, or its identity to another user.

Thus, there is a need for both privacy and authentication between users of the network communicating with one another. In other words, users should be able to rely on the fact that their transmissions will not be intercepted or altered, and that transmissions from someone purporting to be a particular user do in fact originate from that user.

In many secure communication applications, a seed is required in order to perform certain cryptographic operations such as encryption, decryption, authentication, etc. The seed may comprise, by way of example, a symmetric key or other secret shared by two or more entities.

One such application is in authentication tokens, such as the RSA SecurID authentication token available from RSA, The Security Division of EMC, of Bedford, Mass., U.S.A. The RSA SecurID authentication token is used to provide two-factor authentication. Authorized users are issued individually-registered tokens that generate single-use token codes, which change based on a time code algorithm. For example, a different token code may be generated every 60 seconds. In a given two-factor authentication session, the user is required to enter a personal identification number (PIN) plus the current token code from his or her authentication token. This information is supplied to an authentication entity. The authentication entity may be a server or other processing device equipped with RSA Authentication Manager software available from RSA Security Inc. The PIN and current token code may be transmitted to the authentication entity and if the PIN and current token code are determined to be valid, the user is granted access appropriate to his or her authorization level. Thus, the token codes are like temporary passwords that cannot be guessed by an attacker, with other than a negligible probability.

Referring to FIG. 1, there is illustrated an example of a system 100 that facilitates secure communication over a network. The system 100 comprises an authentication entity, for example, a server 105 for assisting in authenticating a user 110. To enable authentication, the user 110 can communicate with a user authentication device 120 for information used to authenticate the user 110. The user authentication device 120 may be a RSA SecurID token as discussed above. The user authentication device 120 may store a seed or secret that may be used to help authenticate the user 110. Typically, the seed may be information that only is available to the authentication device 120 and the server 105. For example, the seed can be used to help generate an authentication code for the user 110. The user authentication device 120 may also access dynamic data, which, for example, can be the current time, if implemented with a running clock. Additionally, in addition to a seed, the device 120 may receive a personally selected secret from the user 110 and generate a dynamic, non-predictable authentication code value in response to the secret received from the user 110, the seed, and the current time. Here, for example, a non-predictable authentication code value may be unpredictable to anyone who does not have access to the secret received from the user 110, the stored secret, and the algorithm that generates the authentication code value.

It will be appreciated that the user 110 may have access to a communications terminal 140 such as a personal computer, a personal digital assistant (PDA) or a similar device. During the authentication process the user may read a passcode from the user authentication device 120 and enter the code manually to the communications terminal 140. Alternatively, the user authentication device 120 may communicate with the communications terminal 140 to deliver the passcode thereto. The communications terminal 140 may communicate information to the server 105 via a communications channel 170. The communications channel 170 can be any method and/or interface that enables communication of information to the server 105 that may be required to authenticate the identity of the user 110. The communications terminal 140 can communicate information generated by the user 110, the device 120, or both, to the server 105 over the communications channel 170.

In order to authenticate the user, the server 105 performs algorithmic calculations for each user authentication attempt that is substantially identical to the algorithmic calculation performed by the user authentication device 120. The server 105 compares the authentication information received over communications channel 170 and the authentication information generated by the server 105 to determine whether there is a match. If there is a match, then the server 105 can authenticate the identity of the user 110.

Referring to FIGS. 2 and 3, there is illustrated an example of a user authentication device 200 suitable for issuing a passcode for authenticating a user. The device may be a RSA authentication token comprising a LCD display 210 for issuing a passcode to a user. The device may also contain a plug portion for plugging into a USB port. This facilitates communication between the communications terminal, for example, a computer, and the device. The display 210 in FIG. 3 is illustrated in a non-energized non-operational state comprising six passcode numerals (888 888) that may represent a passcode. The display also comprises three peripheral numerals (1, 2, 3) and a diamond character (0) located on the right side periphery thereof. Additionally, the display comprises countdown bars on the left side periphery thereof. The countdown bars may illustrate the time remaining before a new passcode is issued and displayed on the display. For example, a new passcode may be issued and displayed every sixty seconds and one countdown bar may disappear every ten seconds to illustrate the time remaining before a new passcode is displayed.

It will be appreciated that when the token as described above is created the unique seed for the token is placed into a token record. The token record may then be loaded into the authentication entity, for example, the server to allow the token to be used in an authentication event.

Accordingly, a mechanism or technique is required for delivering (e.g., securely delivering) the token records from a token manufacturer to an end customer. If the information in a token record is revealed to an attacker, there is a risk that the attacker may be able to use such information to the attacker's advantage. In particular, a mechanism or technique is required for distributing the tokens through indirect channels such as a value added reseller or some other third party. Typically, these indirect distributors maintain an inventory of tokens in stock such that the end customers can buy tokens as needed. Indirect distribution adds a layer of security complexity to token record distribution since the end customer may be unknown to the token manufacturer at the time that the tokens are programmed and the token records are produced by the manufacturer. Furthermore, when leveraging indirect distribution, the personnel and processes of the indirect partner are outside the control of the token manufacturer and therefore the manufacturer cannot always assume that the indirect partner is totally secure.

In the past, storage media such as CD-ROMs have been used to distribute token records with token shipments.

Other techniques have also been used in the past to deliver token records.

SUMMARY OF THE INVENTION

A method and system for use in distributing token records in a market environment, wherein at least one token record comprises a unique seed associated with a one-time password (OTP) token, is disclosed. An encryption key and a decryption key are generated for assisting selective encryption and decryption of a token record associated with a OTP token. The token record is encrypted with the assistance of the encryption key. One of the encrypted token record and the decryption key is provided into the market environment. A device comprising an identifier for facilitating identification of the token record associated with the OTP token is provided into the market environment together with the one of the encrypted token record and the decryption key, wherein the identifier is concealed by a tamper-evident removable material such that any effort to reveal the identifier will be readily apparent. The other of the encrypted token record and the decryption key is provided to an entity in response to the entity providing the identifier.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
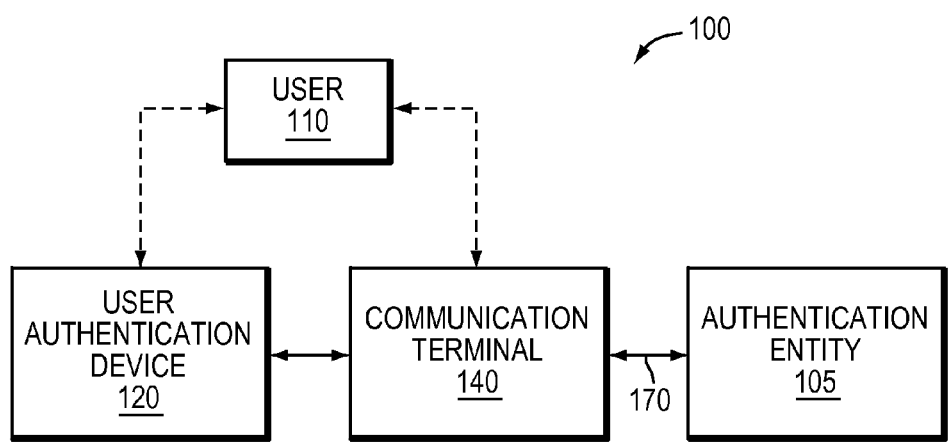
FIG. 1 is an example of a system for enabling secure communication over a network.
Figure 2:
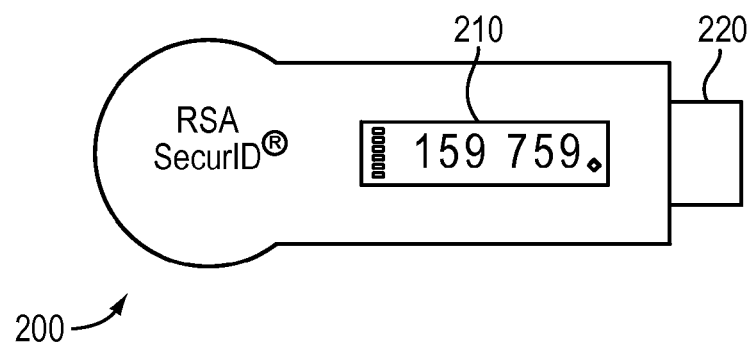
FIG. 2 is an example of a user authentication device.
Figure 3:
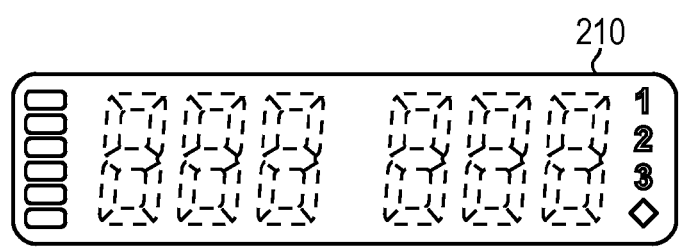
FIG. 3 is an example of a display of the device of FIG. 2.
Figure 4:
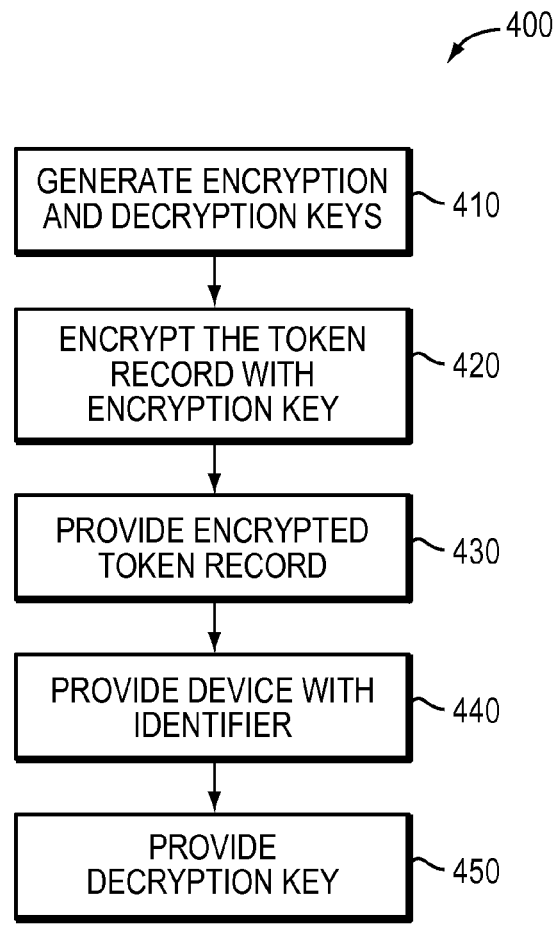
FIG. 4 is a flowchart summarizing the steps of a technique for distributing token records in a market environment.

Referring to FIG. 4, there is illustrated a technique 400 for distributing token records in a market environment. For example, the technique may be suitable for use in distributing token records to a value added reseller or distributor in a market environment. The reseller may in turn distribute the token records to an end customer or end user. It will be known to those skilled in the art that one-time password (OTP) tokens, for example, RSA SecurID tokens, are individually programmed by the token manufacturer with unique seeds. The unique seed value for a token is then placed into a token record. The seed may be placed in the token record along with other data such as the type of token, operational characteristics of the token, and the token serial number. It will be appreciated that the token records may be distributed together with the one-time password (OTP) tokens with which the token records are associated. The token records when received by the end user may be loaded onto, for example, an authentication server to allow the tokens to be used.

Typically, it is the case that an end user or customer will order multiple packs of tokens from the token manufacturer or a value added reseller. The token records may for each pack of tokens be placed in a single token record file. For example, an order for 150 tokens may include a pack of 100 tokens and a pack of 50 tokens. The customer may receive two files containing token records, one with 100 records and one with 50 records. However, in this embodiment, it will be described for simplicity purposes only a technique for distributing a single token record associated with a single OTP token. It will be appreciated, however, that the technique may be used to distribute a token record file or files containing tokens records associated with multiple OTP tokens.

The technique as described herein comprises generating 410 an encryption key and a decryption key for assisting selective encryption and decryption of a token record associated with an OTP token. It will be appreciated by those skilled in the art that the keys may be generated using hardware based random number generators or any other suitable method. It will also be appreciated by those skilled in the art that the encryption and decryption keys may be different or the same keys may be used to encrypt and decrypt. The technique comprises encrypting 420 the token record with the assistance of the encryption key. Although not limiting, it is preferred that the token records are encrypted, using a standard mechanism, such as PKCS #7 to encrypt and envelope the data. The technique comprises providing 430 the encrypted token record into the market environment. For example, the encrypted token record may be provided to the value added reseller on a storage medium. As discussed above, it may be provided together with the OTP tokens with which it is associated. However, the decryption key for decrypting the encrypted token record is not provided into the market place. It will be maintained by the token manufacturer. It will be appreciated in some instances it may be maintained by a related party or a trusted third party on behalf of the token manufacturer. The technique also comprises providing 440 a device comprising an identifier for facilitating identification of the token record associated with the OTP token. The device may be provided into the market environment as part of a package together with the encrypted token record and the associated token. In this embodiment, the identifier is concealed by a tamper-evident removable material such that any effort to reveal the identifier will be readily apparent. For example, the device may comprise a base layer on which the identifier is provided. Furthermore, the tamper-evident removable material may be an irreversibly removable material in the form of a coating covering the identifier which may be removed by scratching at the material. It will be appreciated by those skilled in the art that the device may be similar to a scratch card or a lottery ticket. The identifier may comprise a random numerical or alphanumerical code or codes for facilitating identification of the token record associated to the OTP token. The code or codes may be unrelated to the token. The technique also comprises providing 450 the decryption key to an entity in response to the entity providing the identifier such that the encrypted token record can be decrypted by the entity. For example, the entity may be an end customer that purchased the OTP token from the value added reseller. As described above, the OTP token may be provided to the end customer together with the encrypted token record and the device in a package. However, the customer will be unable to use the encrypted token record without obtaining the decryption key. To obtain the decryption key, the user may remove the tamper-evident removable material. For example, the user may scratch the irreversibly removable material covering the identifier to reveal the identifier. The user may in turn contact the token manufacturer with the identifier. For example, the end customer may contact the token manufacturer by visiting a website offered by the token manufacturer. The website may provide the decryption key to the entity in response to the entity providing the correct valid identifier. In this embodiment, the technique is configured to remove the decryption key from the website once it has been provided to the entity in response to providing the identifier. It is preferred that after the decryption key is downloaded, any subsequent attempts to download the decryption key will be rejected and a security warning may be generated. In this way, if an attacker were somehow able to subvert the system before the actual end customer were able to retrieve the key, the end customer would be unable to retrieve it and therefore be prevented from using compromised tokens. The end customer may then contact the token manufacturer to remedy the situation. Similarly, if the actual end customer is the first to successfully download the decryption key, the attacker would not then be able to download the decryption key at some later time.

The technique above describes the step of generating encryption and decryption keys for assisting selective encryption and decryption of the token record. It will be appreciated that the keys may be generated using hardware based random number generators or any other suitable method. In an exemplary embodiment, the technique comprises generating a symmetric key for assisting encryption of the token record. The technique also comprises encrypting 420 the token record with the assistance of the symmetric key. In this embodiment, the technique also comprises generating a second symmetric key for facilitating selective decryption of the encrypted token record. The technique comprises generating the second symmetric key and encrypting the symmetric key with the second symmetric key. The technique also comprises providing the encrypted token record and the encrypted symmetric key together into the market environment. For example, the technique may provide the encrypted token record and encrypted symmetric key stored on a file on a storage medium into the market environment. It will be appreciated that the storage medium may be a CD-ROM. It will be appreciated by those skilled in the art that the second symmetric key will be considered as the decryption key. In this embodiment, the technique also stores the second symmetric key at the token manufacture. The technique may be configured such that the end user can access the stored second symmetric key over a network. For example, the second symmetric key may be accessed and provided to the end customer over the internet in response to the end user providing the correct identifier on the device. The second symmetric key allows the user to decrypt the encrypted symmetric key and the decrypted symmetric key can in turn decrypt the encrypted token record. The second symmetric key thereby assists in the decryption of the encrypted token record.

Figure 5:
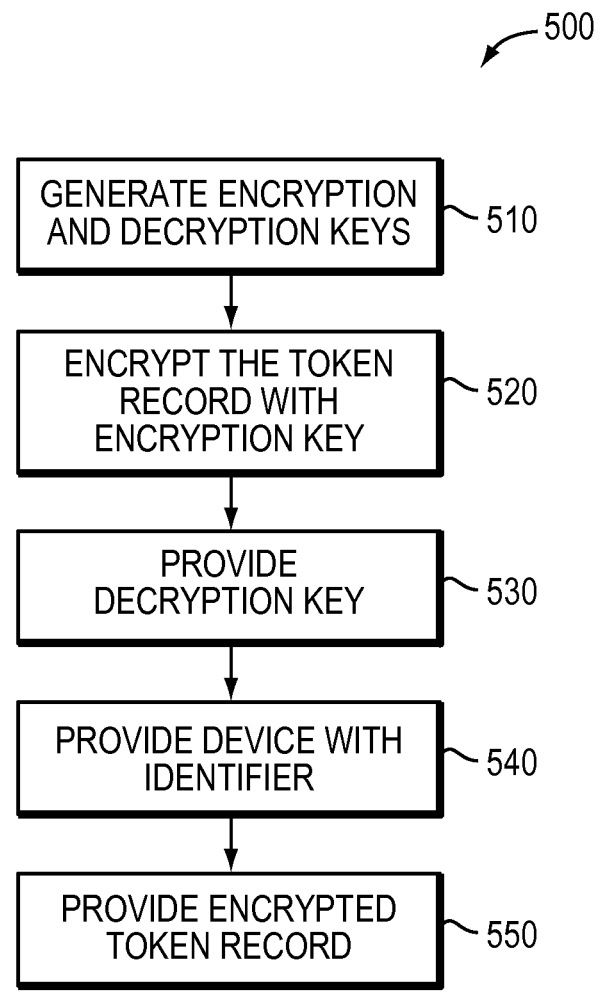
FIG. 5 is a flowchart summarizing the steps of another technique for distributing token records in a market environment.

Referring to FIG. 5, there is illustrated a technique 500 for distributing token records in a market environment. For example, the technique may be suitable for use in distributing token records to a value added reseller or distributor in a market environment. The technique is substantially similar to the technique as described above in relation to FIG. 4 and it will be appreciated that substantially similar steps may be executed in a similar manner and the comments disclosed above with respect to substantially similar steps also apply with respect to this technique. The technique comprises generating 510 an encryption key and a decryption key for assisting selective encryption and decryption of a token record associated with an OTP token. It will be appreciated that the keys may be generated using hardware based random number generators or any other suitable method. The technique comprises encrypting 520 the token record with the assistance of the encryption key. Although not limiting, it is preferred that the token records are encrypted, using a standard mechanism, such as PKCS #7 to encrypt and envelope the data. The technique comprises providing 530 the decryption key into the market environment. It may be provided together with an OTP token to which the token record is associated as a token package. However, if the decryption key is provided the encrypted token record is not provided. It will be maintained by the token manufacturer. As discussed above, it may also in certain instances be maintained by a related party or a trusted third party on behalf of the token manufacturer. The technique also comprises providing 540 a device comprising an identifier for facilitating identification of the token record associated with the OTP token. In this embodiment, the identifier is also concealed by a tamper-evident removable material such that any effort to reveal the identifier will be readily apparent. The identifier may comprise a random numerical or alpha-numerical code or codes for facilitating identification of the token record associated to an OTP token. It may also comprise the decryption key required to decrypt the encrypted token record. The key may also be in the form of random numerical or alphanumerical code or codes. The identifier and decryption code may both be revealed by, for example, scratching and removing the material. The technique also comprises providing 550 the encrypted token record to an entity in response to the entity providing the identifier such that the encrypted token record can be decrypted by the entity. For example, the entity may be an end customer that purchased a OTP token from the value added reseller. The OTP token may be provided to the end customer together with the device in a package as described above. The device reveals an identifier and the decryption key behind the tamper-evident removable material. However, the decryption key will be no use to the end customer without the encrypted token record. To obtain the encrypted token record, the user may, for example, scratch the material covering the identifier to reveal the identifier. The customer or user may in turn contact the token manufacturer with the identifier. For example, the end customer may contact the token manufacturer by visiting a website offered by the token manufacturer. The website may provide the encrypted token record to the entity in response to the entity providing a correct valid identifier. In this embodiment, the technique is configured to remove the encryption token record from the website once it has been provided to the entity in response to providing the identifier.

The advantages of the above techniques are many. The techniques require that the token record be encrypted in order to protect its sensitive information. Additionally, the techniques require that the encrypted token record and the decryption key are never provided together. Rather, one of the encrypted token record and the decryption key will be provided into the market environment and the other of the encrypted token record and decryption key will be maintained by the token manufacturer and provided to the end user only in response to a valid correct identifier being provided to the token manufacturer. Accordingly, the encrypted token record may be shipped using insecure shipping transports. Use of such transports will have no impact on the security of the information contained in the token record as the encrypted token record and the decryption key will never be shipped together. In order to use the OTP token, it will be necessary to have possession of the token itself, the encrypted token record, and the key needed to decrypt the token record. The end user will only be able to possess all three if the end user is able to provide the correct identifier on the device to the token manufacturer. The identifier will only be revealed by removing the tamper-evident removable material from the device so it will be readily apparent to the end user if the device has been tampered with in transit from the token manufacturer. In such a case he will realize immediately that the tokens are compromised.

Moreover, if an attacker were somehow able to subvert the system before the actual end customer retrieved the encrypted token record or the decryption key, the end customer would be unable to retrieve either the encrypted token record or the decryption key as it would be removed when it was initially provided or downloaded and therefore the end customer would be prevented from using a compromised token. The end customer would be expected to then contact the token manufacturer to remedy the situation. Similarly, if the actual end customer is the first to successfully download the encrypted token record or the decryption key, the attacker would not then be able to download at some later date.

While it has been described above in relation to the technique 500 that the device comprises the identifier and the decryption key behind the tamper-evident removable material it will be appreciated that the decryption key may be split, such that part of it is on the device, and part of it is obtained from the token manufacturer. In this way, the token manufacturer would not retain the full password or passcode for decrypting the token record but just the part that would complete the decryption key.

While it has been described above that the entity or end customer or user contacts the token manufacturer over a network, for example, the internet it will be appreciated that the end user could contact the token manufacturer, for example, via the phone, and provide the identifier to the token manufacturer. The token manufacturer would verify the information and respond by providing either the decryption key or the encrypted token record to the entity or end user. The technique may be configured to provide either the decryption key or the encryption token record over a network or on a storage medium. It will be appreciated that the entity or end user may use other channels of communication including, but not limited to mail, secure shipping, email, secure email, SMS messages and the like.

While it has been described above that a symmetric key is generated for encrypting the token record and a second symmetric key for encrypting the symmetric key, it may be that the symmetric key is encrypted and wrapped with several symmetric keys. A technique known in the art is often called "key wrapping" where one or more keys are used to protect another key. This technique is used when a number of keys are required to decrypt an object. For example, a second and third symmetric key may be generated and the symmetric key may be encrypted and wrapped with the second and third symmetric keys. In such a scenario, the second and third symmetric keys act as decryption keys and any one of the second and third symmetric keys may be used to decrypt the encrypted symmetric key. This may be advantageous when the entity requires more than one decryption key for decrypting the token records. This may be the case when an entity comprises a number of administrators that are required to have a decryption key.

While it has been described above that a device is provided comprising an identifier concealed by a tamper-evident material such as an irreversibly removable material that can be scratchably removed, it will be apparent to those skilled in the art that this is an example only and other examples are possible. For example, a device may be provided comprising an identifier wherein the identifier is concealed by a tamper evident sealable envelope such that any efforts to reveal the identifier will be readily apparent.

While it has been described above that an identifier is provided for facilitating the identification of the token record associated with the OTP token, it will be appreciated that one or more identifiers may be provided. For example, the identifier may be one or multiple discrete codes.

While the techniques as described above are described for distributing a token record associated with an OTP token, it will be apparent that the technique may be used in connection with the distribution of multiple token records and tokens. For example, the token records may form part of one or more packs comprising multiple token records and tokens. The token records may be in a token record file. It will be appreciated that each pack may require a unique decryption key to decrypt the token records. It will also be appreciated that the device comprising the identifier may also form part of the packs. Moreover, the identifier may comprise a token pack identifier and a random verification code associated with the decryption key needed to decrypt the encrypted token records.

While the invention has been disclosed in connection with preferred embodiments shown and described in detail, modifications and improvements thereon will become readily apparent to those skilled in the art. Accordingly, the spirit and scope of the present invention should be limited only by the following claims.

What is claimed is:

1. A method, comprising:
    generating an encryption key and a decryption key for use in the encryption and decryption of data;
    encrypting the data with the assistance of the encryption key;
    providing a device comprising an identifier and part of a decryption key, wherein the identifier and the part of a decryption key are concealed by a tamper- evident removable material;
    receiving the identifier from an end user;
    in response to receiving the identifier, determining if the identifier is valid; and
    in response to determining that the identifier is valid, providing the encrypted data and other part of the decryption key to the end user such that the end user will possess the encrypted data and the decryption key for decrypting the encrypted data.

2. The method as claimed in claim 1, wherein generating the encryption key comprises generating a symmetric key for assisting selective encryption of the data.

3. The method as claimed in claim 2, wherein the symmetric key is a randomly generated symmetric key.

4. The method as claimed in claim 2, wherein the data is encrypted with the assistance of the symmetric key.

5. The method as claimed in claim 4, further comprising:
    generating a second symmetric key; and
    encrypting the symmetric key with the assistance of the second symmetric key.

6. The method as claimed in claim 5, wherein providing the encrypted data comprises providing the encrypted data and the encrypted symmetric key.

7. The method as claimed in claim 6, wherein providing the decryption key comprises providing the second symmetric key for assisting selective decryption of the encrypted symmetric key which in turn can decrypt the encrypted data.

8. The method as claimed in claim 1, wherein the identifier is provided on a base layer and the tamper-evident removable material is an irreversibly removable material covering the identifier on the base layer.

9. The method as claimed in claim 8, wherein the irreversibly removable material comprises a scratchable coating that can be permanently removed by scratching the coating.

10. The method as claimed in claim 8, wherein the identifier comprises a random identifier.

11. A system, comprising:
    first logic generating an encryption key and a decryption key for use in the encryption and decryption of data;
    second logic encrypting the data with the assistance of the encryption key;
    third logic providing a device comprising an identifier and part of a decryption key, wherein the identifier and the part of a decryption key are concealed by a tamper-evident removable material;
    fourth logic receiving the identifier from an end user;
    in response to receiving the identifier, fifth logic determining if the identifier is valid; and
    in response to determining that the identifier is valid, sixth logic providing the encrypted data and other part of the decryption key to the end user such that the end user will possess the encrypted data and the decryption key for decrypting the encrypted data.

12. The system as claimed in claim 11, wherein generating the encryption key comprises generating a symmetric key for assisting selective encryption of the data.

13. The system as claimed in claim 12, wherein the symmetric key is a randomly generated symmetric key.

14. The system as claimed in claim 12, wherein the data is encrypted with the assistance of the symmetric key.

15. The system as claimed in claim 14, further comprising:
    seventh logic generating a second symmetric key; and
    eighth logic encrypting the symmetric key with the assistance of the second symmetric key.

16. The system as claimed in claim 15, wherein providing the encrypted data comprises providing the encrypted data and the encrypted symmetric key.

17. The system as claimed in claim 16, wherein providing the decryption key comprises providing the second symmetric key for assisting selective decryption of the encrypted symmetric key which in turn can decrypt the encrypted data.

18. The system as claimed in claim 11, wherein the identifier is provided on a base layer and the tamper-evident removable material is an irreversibly removable material covering the identifier on the base layer.

19. The system as claimed in claim 18, wherein the irreversibly removable material comprises a scratchable coating that can be permanently removed by scratching the coating.

20. The system as claimed in claim 18, wherein the identifier comprises a random identifier.

* * * * *